United States Patent

Hockensmith et al.

[11] 4,004,695
[45] Jan. 25, 1977

[54] CHANNEL AND PLATE TELESCOPIC CRANE BOOM

[75] Inventors: John L. Hockensmith, Chambersburg; John L. Grove, Greencastle, both of Pa.

[73] Assignee: Fulton Industries, Inc., McConnellsburg, Pa.

[22] Filed: Apr. 16, 1975

[21] Appl. No.: 568,665

[52] U.S. Cl. .................. 212/144; 52/118; 212/59 R
[51] Int. Cl.² .......................... B66C 23/04
[58] Field of Search .......... 212/144, 55, 50 R; 52/118, 731; 308/3 R

[56] References Cited

UNITED STATES PATENTS

| | | | |
|---|---|---|---|
| 3,243,052 | 3/1966 | Grove | 212/55 |
| 3,481,490 | 12/1969 | Eiler | 212/55 |
| 3,792,555 | 2/1974 | Sung | 212/55 |
| 3,837,502 | 9/1974 | Hornagold | 212/144 |

Primary Examiner—Robert J. Spar
Assistant Examiner—Lawrence J. Opesky
Attorney, Agent, or Firm—Irvin A. Lavine

[57] ABSTRACT

A telescopic crane boom is provided in which tubular boom sections include a thicker, flat bottom plate and a thinner channel having the free edges of its walls welded to the bottom plate at the lateral edges of the bottom plate. Wear pads for supporting an outer boom section, e.g., the fly section, are placed on the bottom plate of the adjacent inner section, e.g., the mid-section, closely adjacent to the vertical walls of the inner section, and underlying the walls of the outer section, to provide substantially columnar support for the walls of the outer section, reduced bottom plate bending forces, and reduced boom width and weight.

8 Claims, 6 Drawing Figures

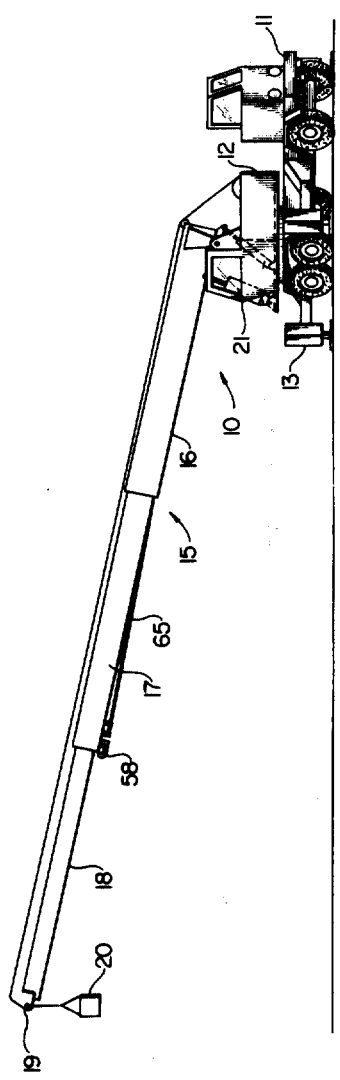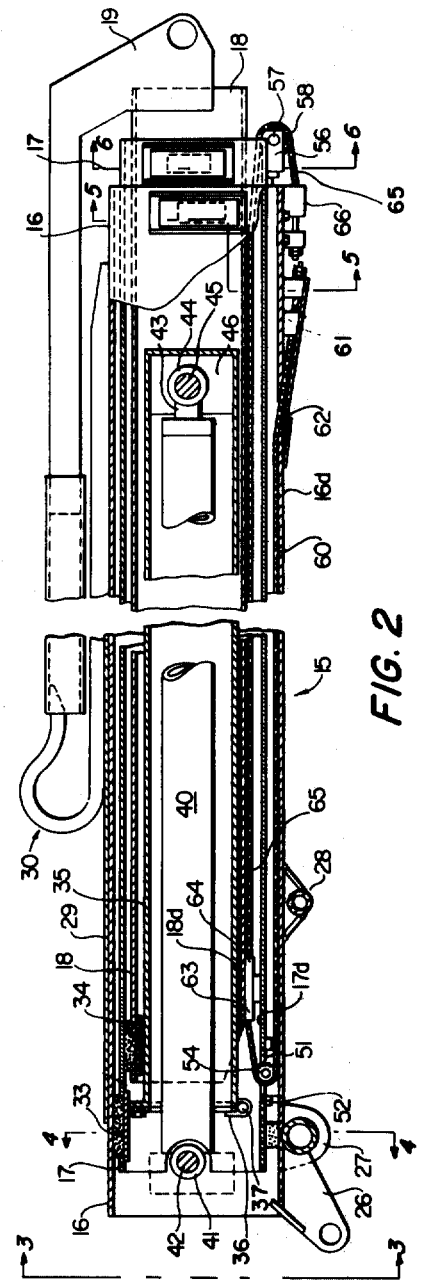

CHANNEL AND PLATE TELESCOPIC CRANE BOOM

BACKGROUND OF THE INVENTION

The present invention relates to a telescopic boom for lifting a load, such as is used in cranes and aerial platform apparatus.

Telescopic booms have long been used for lifting and moving loads, such as in connection with cranes, and have also been used where the load is, specifically, a workman supported in a workmans's basket or platform. Various constructions have heretofore been proposed and used, the primary desideratum in connection with such constructions being that they sustain the anticipated load, with any necessary factor of safety selected, and that the structure be as light as possible, consistent with safety.

One construction which has been used is the formation of tubular sections of the telescopic boom is two channels placed in facing relationship so as to form a box-like or tubular construction, with the free, longitudinally extending edges of the two channels being welded together, and with the welds being the top and bottom plates of the tubular boom section thereby formed. It is the conventional practice, after formation of the tubular boom sections, to provide them with suitable wear pads of low friction material, to permit the sections to slide telescopically one within another. These wear pads are known to be the part of the boom structure which transfers loads and forces from one boom section to another. In the placement of wear pads on the bottom plate of one boom section, to cooperate with the bottom plate of the adjacent telescopic boom section, it was found necessary with the above-described boom construction to place the wear pads inwardly from the side walls of the boom section. This was because of the radius required for the bending of the metal of which the channel was formed so as to provide webs and flanges extending generally perpendicularly. It is known that the radius of bend of such channels must be several times the thickness of the material. This inward location of the wear pads is known to cause bending of the bottom plate of the supported boom section, and to counteract this bending, the bottom plate was provided with an additional stiffening plate. Alternatively, because one-half of the bottom plate and one-half of the top plate, and the side wall were of a channel of uniform thickness, increasing the thickness of the bottom plate necessarily increased the thickness of the sides and top, thereby adding unnecessarily to the thickness and therefore to the weight of the boom section.

A number of the above discussed problems have been recognized in a proposal of a telescoping boom construction in which the tubular boom sections were made of a pair of vertical side walls or webs having their top and bottom edges welded to top and bottom plates or webs, the vertical webs being spaced inwardly from the longitudinal edges of the top and bottom webs. This construction of the box section completely eliminated radii present in the prior art structures as above described, the corners formed where the webs are joined by welding being square. The wear pads to support such a boom section, from the next larger boom section, were placed so as to be substantially directly over and under the side webs, the wear pads extending outwardly beyond the side walls or webs, engaging the upper surface of the top plate and the lower surface of the bottom plate, which top and bottom plates also extended substantially beyond the side walls or webs. This construction provides for the width of the boom sections being greater than the width between the outer surfaces of the vertical side walls or webs, thereby adding to the width and consequently the weight of the boom. This construction, also, provided uniform thickness of the four plates which were welded together to make up a boom section, and this construction further required a minimum of four longitudinally extending welds, each of which was provided to connect one web or plate to the web or plate adjacent and perpendicular to it.

There have also been disclosed, in the prior art, a boom having telescopic sections each comprising a bottom plate having a channel joined to it, as well as a boom made up of two essentially channel-shaped elements, the lower element being of greater thickness than the upper element.

SUMMARY OF THE INVENTION

The present invention provides a telescopic crane boom having tubular boom sections characterized by a relatively thicker flat bottom plate, having welded to it a channel of thinner material, the free edges of the walls formed by the channel being welded to the bottom plate. The width of the bottom plate is substantially the same as the distance between the outer surfaces of the side plates of the channel: preferably, the bottom plate extends laterally beyond the channel a distance sufficient only to receive a suitable deposit of welding material. Wear pads are provided on the upper surface of the bottom plate of a boom section constructed in the above described manner, for supporting a boom section which is telescopically within the above described boom section: these wear pads are laterally spaced apart, and are closely adjacent to the vertical walls of the supporting boom section, while underlying the walls of the supported boom section. The outer edges of the wear pads are approximately in the plane of the side walls, the centers of the wear pads being inwardly of the side walls of the supported boom section.

Among the objects of the present invention are to provide a telescopic boom of relatively light weight, consistent with safety. Another object of the present invention is the provision of a telescopic boom having reduced bending of the bottom plate of the boom section. A further object of the present invention is to reduce and/or eliminate the presence of material excess to strength requirements. A still further object of the present invention is the provision of a telescopic boom of lesser width and weight, in comparison to similar booms. Still another object of the present invention is the provision of a telescopic boom of lower production cost, effected by reduction in fabrication steps and consequently, fabrication cost.

Other objects and many of the attendant advantages of the present invention will be readily understood from the following specification and drawing.

BRIEF DESCRIPTION OF THE DRAWINGS

FIG. 1 is an elevational view of a mobile crane with telescopic boom in accordance with the present invention.

FIG. 2 is an enlarged longitudinal view with parts in section of the boom shown in FIG. 1.

DESCRIPTION OF THE PREFERRED EMBODIMENT

Figure 3:
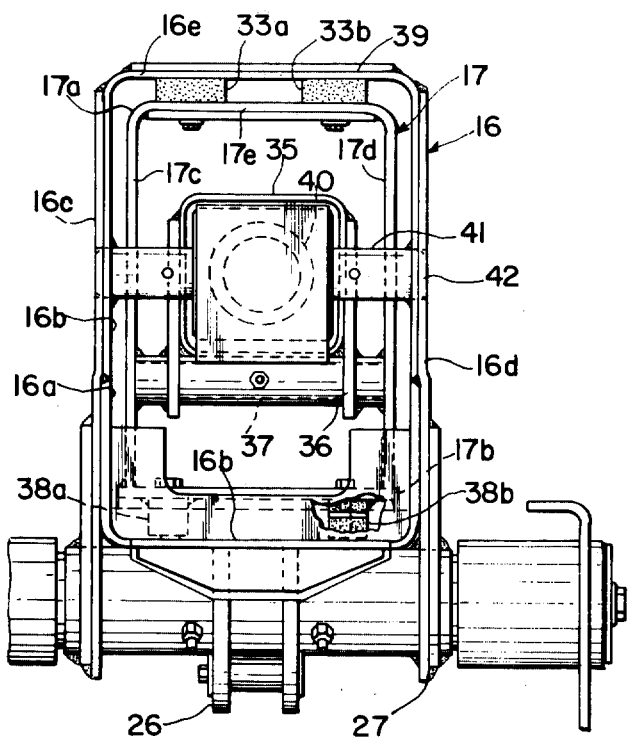
FIG. 3 is an enlarged view taken on the line 3—3 of FIG. 2.

Referring now to the drawings, wherein like or corresponding reference numerals are used to designate like or corresponding parts throughout the several views, there is shown in FIG. 1 a crane generally designated 10, crane 10 being illustrated as a mobile or vehicle-mounted crane, including a vehicle 11, a turn table 12 and outriggers 13. The telescopic extensible crane boom is generally designated 15, and comprises a first or base section 16, a second or mid-section 17, and a third or fly section 18. The outer end of the fly section 18 is provided with a supporting nose 19, to which is attached a workmans's basket or aerial platform 20. Controls are preferably provided in the aerial platform 20 for controlling the extension and retractions of the sections 17 and 18, and other controls may be provided as is well known to those skilled in the art, as for raising and lowering boom 15 and for rotating the entire boom including the turn table 12. By way of illustration, raising and lowering cylinder 21 may be seen connected to the turn table 12 and to the base section 18 of the boom 15.

Referring now to FIG. 2, the telescopic boom 15 is shown in cross section, and in its retracted position. Thus, each of the hollow boom sections of lesser strength and of smaller transverse hollow cross sectional dimensions is telescopically received in and supported by the next boom section of larger cross section and of higher strength. The base section 16 is provided with depending ears 26 for connection to a cylinder, a second ear 27 being provided for receiving a pivot pin (not shown) on which the boom 15 may be raised and lowered, and a third ear and axle construction 28 for connection with a lift cylinder, such as the lift cylinder 21 shown in FIG. 1. On its top, the base section 16 is shown provided with a reinforcing plate 29, and lying thereon is a conduit group 30 which can provide for suitable electrical and/or hydraulic conduits extending from the aerial platform 20 to the various elements to be controlled.

Within base section 16 is the mid-section 17, which is provided at its inner end with a wear-pad 33 for engagement with supporting base section 16. The fly section 18 is positioned inwardly of the mid-section 17, and a wear-pad 34 engages mid-section 17. Inwardly of the fly section 18 there is a hollow housing 35 which is provided with a flange 36 at its inner end, to the left as shown in FIG. 2, which flange 36 is secured to a shaft 37 that is secured to the mid-section 17 adjacent its inner or rear end. A fluid motor 40, specifically in the form of a double acting hydraulic cylinder, is also shown in FIGS. 2 and 3. At its rear end, fluid motor 40 is connected with a transverse tube 41 within which is a pivot pin 42; pivot pin 42 is connected to the base section at the inner or rear end thereof. The fluid motor 40 at its outer end has an extending rod 43 on which is a tube 44, a pin 45 being received in the tube 44 and being supported by a pair of spaced apart support plates; support plate 46 is shown in FIG. 2. The support plates are fixed to the hollow housing 35 at its outer end, so that actuation of fluid motor 40 will cause the mid-section 17 to be linearly moved relative to base section 16, through the connection provided by the hollow housing 35, flange 36 and mounting plate 37.

A mechanical linkage system is provided for extending the fly section 18 concurrently with extension of the mid-section 17, and for retracting fly section 18 concurrently with mid-section 17. The mid-section 17 has in its bottom plate an aperture 51 which is adjacent to its inner end, just outwardly or forwardly of the mounting plate 37. The aperture 51 has mounted beneath it a sprocket mounting assembly 52 secured to the bottom of the bottom plate. Mounting assembly 52 has journalled therein a sprocket shaft which carries a pair of rear or inner sprockets 54 in transverse spaced relationship. At its outer end, the mid-section 17 is provided with a mounting assembly 56 suitably secured to the bottom plate, there being a sprocket shaft 57 therein, and having a pair of spaced outer or forward sprockets 58 journalled thereon. The sprockets 54 and 56 serve as guides, and revolve about shafts 53 and 57 which have their axes below the level of the bottom plate of mid-section 17.

The base section 16 near its outer end is provided with a first anchor 61 on the bottom surface of the bottom plate thereof, inwardly of which is an aperture 62, and a pair of chains 60 extend from the anchor 61 through the aperture 62 and thence rearwardly, in the space between the bottom of the base section 16 and the bottom of mid-section 17, to the sprockets 54, shown in FIG. 2. The chains 60 are trained on the sprockets 54 and pass therearound, and thence forwardly to an anchor 63 fastened to the bottom of the fly section 18. Just forwardly of the anchor 63 is an anchor 64, similarly connected to the bottom of fly section 18 and connected to the anchor 64 are a pair of chains 65 which extend forwardly from the anchor 64, around sprockets 58 and are connected by an anchor 66 to the bottom of base section 16.

When the cylinder 40 is actuated, it will cause the mid-section 17 to extend and retract relative to the base section 16, and when the midsection 17 extends, the sprocket 58 will move away from base section 16 and will exert a pull on chain 65, causing it to pull out the fly section 18. Reverse movement will cause the sprocket 54 to move, and to pull on the chain 60, which will retract the fly section 18.

The above construction and operation are generally similar to that disclosed in John L. Grove U.S. Pat. No. 3,809,249, issued May 7, 1974.

Referring now to FIG. 3, there may be seen the base section 16, mid-section 17, and housing 35, together with the connections between housing 35 and mid-section 17 and between the motor 40 and base section 16. The base section 16 comprises a pair of channels 16a and 16b; channel 16a is upwardly facing and is of relatively thick metal, whereas channel 16b is downwardly facing, and of relatively thin material, in comparison to channel 16a. The two channels are joined together by a pair of longitudinally extending welds. Reinforcing plates 16c and 16d are secured to the base section sides, these plates being somewhat deformed adjacent the welds between the channels 16a and 16b, as shown.

The mid-section 17 comprises an upper channel member 17a of relatively thin material, which is downwardly facing, and which is secured to a bottom plate 17b. Channel member 17a is U-shaped, and bent from one plate or sheet of metal of uniform thickness, as shown in FIGS. 3–6. The bottom plate 17b is of material which is thicker than that of the channel 17a, because the bottom of a tubular boom section is found to be subjected to greater loading and stress than the sides and top. Consequently, the channel 17a, provides a pair of vertical sides 17c and 17d, and a top or top plate 17e, all of which are, of course, integral. The width of the bottom plate 17b is slightly larger than the distance between the outside surfaces of the sides 17c and 17d, in practice the excess width of bottom plate 17b being only enough to provide support for welding material. Welding material is deposited on this excess bottom plate width portion to join the channel to the bottom plate as well as on the inside of the channel, as shown in the drawings: sufficient welding material is deposited to achieve the required structural strength.

The mid-section 17 is provided with wear-pads 33a and 33b, which engage the bottom of the top plate 16e of base section 16. Bottom plate 17b carries a pair of spaced wear-pads 38a and 38b, which engage the bottom plate 16b of base section 16.

Figure 4:
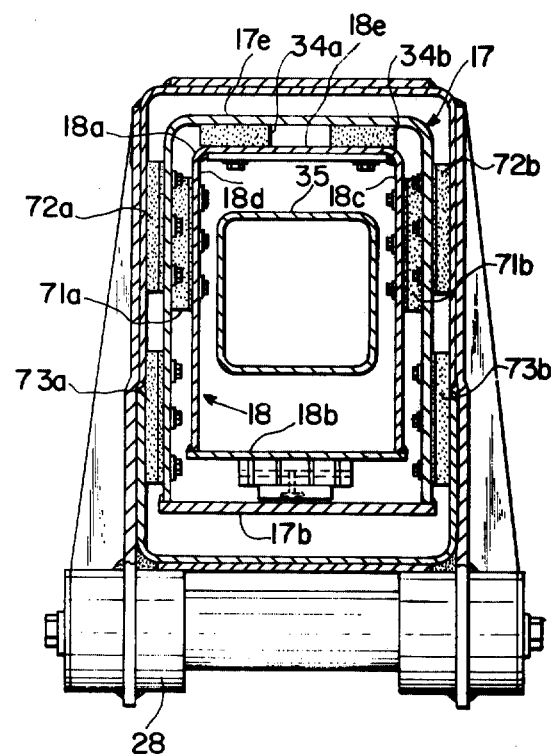
FIG. 4 is an enlarged cross sectional view taken on the line 4—4 of FIG. 2.

As shown in FIG. 4, the housing 35 lies within fly section 18, which has an upper channel member 18a which includes a pair of vertical sides 18c and 18d, and a top or top plate 18e. The channel 18a has the free edges of the sides 18c and 18d welded to bottom plate 18b, which is of thicker material than the channel 18a. The lateral dimension of bottom plate 18b relative to the sides 18c and 18d is essentially the same as that of bottom plate 17d relative to sides 17c and 17d. Fly section 18 is within and supported by the mid-section 17. Fly section 18 carries a pair of spaced wear-pads 34a and 34b, which engage top plate 17e of mid-section 17, fly section 18 also carrying side wear-pads 71a and 71b. Also, the mid-section 17 carries side wear-pads 72a, 72b and 73a, 73b.

Figure 5:
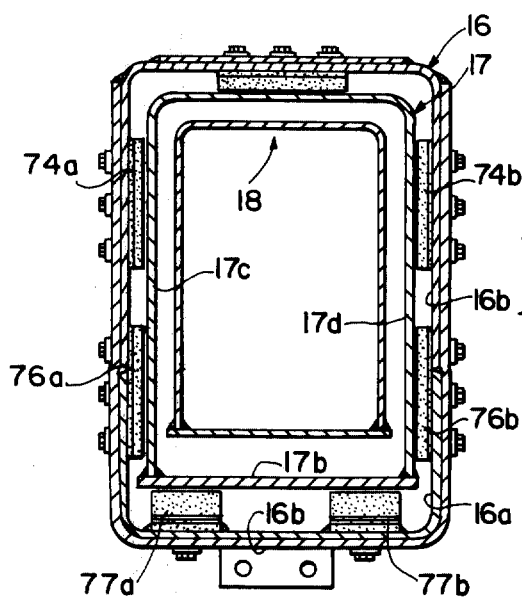
FIG. 5 is an enlarged cross sectional view taken on the line 5—5 of FIG. 2.

In FIG. 5, there is shown in cross section the relationship of the boom section near the outer or free end of the boom 15, the base section 16 being shown and made up of the channels 16a and 16b, and carrying side wear pads 74a, 74b and 76b. In addition, the base section 16 carries wear-pads 77a and 77b which serve to engage and support the mid-section 17, and particularly bottom plate 17b thereof. The outer edge of wear-pad 47a is substantially beneath the side 17c of mid-section 17, a similar relationship being shown between wear-pad 77b and side 17d. The center of wear-pad 77a is slightly inwardly of the side 17c, and similarly the center of wear-pad 77b is slightly inwardly of side 17d. The pads 77a and 77b are spaced outwardly as far as possible, any further outward positioning thereof placing a portion of the wear pads on the radius between the bottoms and sides of the channel 16d of base section 16.

Figure 6:
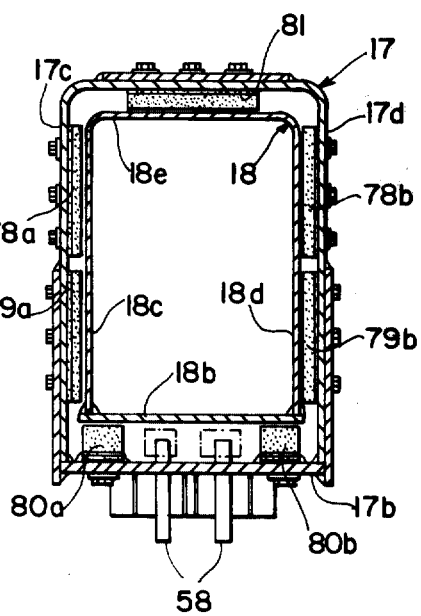
FIG. 6 is an enlarged cross sectional view taken on the line 6—6 of FIG. 2.

In FIG. 6, the fly section 18 is shown within and supported by the mid-section 17, the latter carrying side wear-pads 78a and 78b, and 79a and 79b. The forward or outer end of the bottom plate 17b is slightly narrower than is the remainder of the bottom plate 17b, so that its lateral edges do not extend beyond the plane containing the outer surfaces of the sides 17c and 17d. Bottom wear-plates 80a and 80b are provided, supported on the bottom plate 17b of mid-section 17, and in turn engaging the bottom plate 18b of fly section 18. Wear-pads 80a and 80b are outwardly spaced so as to be adjacent to the sides 17c and 17d, respectively, of mid-section 17, and underlie the junction between sides 18c and 18d of fly section 18 with bottom plate 18b thereof. This is permitted by the essentially square corner provided by the juncture between the sides and bottom of mid-section 17. The center of the wear-pads 80a and 80b lie just inwardly of the junction between sides 18c and 18d with bottom 18b, and as a consequence, there is very little bending moment on the bottom plate 18b from the wear-pads 80a and 80b.

The configuration of the mid-section 17, including the lighter channel and heavier bottom plate, and the same configuration of fly section 18, with differing weights of the elements thereof, together with the placement of the wear-pads 80a and 80b enables the construction of these boom sections to be relatively light, with adequate strength: there is no excess width of these boom sections, nor of their bottom plates and their top plates.

The mid-section 17 carries a top wear-pad 81, which engages the top plate 18e of fly section 18.

There has been provided a telescopic boom of relatively light weight, consistent with strength requirements for safety, providing reduced bottom plate bending, with reduction and/or elimination of excess material. The weight of the boom herein disclosed is reduced, as is the width thereof. It has been found, for example, that a boom in accordance with the present invention, having an extended length of approximately seventy-four feet, has a weight reduction of approximately 10% over booms constructed with two facing channels, and meeting the same strength and size requirements. Further, the boom herein provided is of lower cost to fabricate, due to the relative fewer fabricating steps required, over the prior art, such as bending and welding fabricating steps.

It will be obvious to those skilled in the art that various changes may be made without departing from the spirit of the invention and therefore the invention is not limited to what is shown in the drawings and described in the specification but only as indicated in the appended claims.

We claim:
1. An extensible telescopic boom for a crane or the like comprising:
   a first inner tubular boom section adapted for support on a vehicle, and a second outer tubular boom section telescopically in said inner boom section, said sections supporting a load support,
   each said section including an upper U-shaped one piece bent plate channel shaped member providing sides and a top of uniform thickness, and a plate joined to said channel member providing the bottom of the tubular boom section, said plate having a greater thickness than said channel member, the width of the plate being larger than the distance between the outside surfaces of the sides of said channel shaped member substantially only enough to provide support for welding material, welding material deposited and joining the bottom portion of said side channel shaped member to said plate and positioned at the outer surface of each said side, there being sufficient welding material to achieve required structural strength, and
   laterally spaced wear-pads carried by said inner tubular boom section bottom plate each being adjacent a wall of said inner boom section and underlying a wall of said outer boom section, the outer edge of each said wear-pad being substantially in the plane of the outside surface of the said wall of the said outer boom section, whereby said boom has adequate strength with reduced width and weight and without excessive bending of the boom section bottom plate.

2. The telescopic boom of claim 1, wherein said inner boom section side walls and top support wear-pads for respectively engaging the side walls and top of said outer boom section.

3. The telescopic boom of claim 1, further comprising means for telescoping said outer boom section relative to said inner boom section, said telescoping means comprising longitudinally extending means between said boom plates of said inner and outer boom sections and between said laterally spaced wear-pads.

4. The telescopic boom of claim 3, wherein the lateral center of each of said laterally spaced wear-pads is inwardly of the lower ends of the side walls of the outer boom section.

5. The telescopic boom of claim 3, wherein the lateral center of each of said laterally spaced wear-pads is inwardly of the side walls of the outer boom section.

6. The telescopic boom of claim 1, wherein the lateral center of each of said laterally spaced wear-pads is inwardly of the lower ends of the side walls of the outer boom section 7. The telescopic boom of claim 1, wherein the lateral center of each of said laterally spaced wear-pads is inwardly of the side walls of the outer boom section.

8. The boom of claim 1, wherein the side walls of the boom sections are perpendicularly secured to the said bottom plates thereof.

* * * * *